United States Patent [19]
Ichino

[11] Patent Number: 4,746,831
[45] Date of Patent: May 24, 1988

[54] ULTRASONIC TRANSRECEIVER

[75] Inventor: Kouji Ichino, Tokyo, Japan

[73] Assignee: Kaijo Denki Co., Ltd., Japan

[21] Appl. No.: 841,660

[22] Filed: Mar. 20, 1986

[30] Foreign Application Priority Data

Mar. 27, 1985 [JP] Japan .............................. 60-44501[U]
Jul. 11, 1985 [JP] Japan ............................ 60-106151[U]

[51] Int. Cl.⁴ .......................................... H01L 41/08
[52] U.S. Cl. ..................................... 310/334; 310/327
[58] Field of Search .................................. 310/334–337, 310/327

[56] References Cited

U.S. PATENT DOCUMENTS

| | | | |
|---|---|---|---|
| 2,875,607 | 3/1959 | Boxcer et al. | 310/336 X |
| 3,121,326 | 2/1964 | Klatchko | 310/336 X |
| 3,233,449 | 2/1966 | Harmon | 310/336 X |
| 3,543,065 | 11/1970 | Phelan | 310/336 |
| 3,781,576 | 12/1973 | Runde et al. | 310/336 |
| 3,890,423 | 6/1975 | Zacharias, Jr. | 310/336 X |
| 3,925,692 | 12/1975 | Leschek et al. | 310/327 |
| 4,162,111 | 7/1979 | Brown | 310/336 X |
| 4,240,004 | 12/1980 | Coleman | 310/327 |

FOREIGN PATENT DOCUMENTS 365172 2/1973 U.S.S.R. .............................. 310/336

Primary Examiner—Mark O. Budd
Attorney, Agent, or Firm—Steinberg & Raskin

[57] ABSTRACT

An ultrasonic transreceiver is disclosed which is capable of substantially preventing the formation of a gas boundary layer between a piezoelectric transducer and a housing and the breakage of the transducer due to thermal stress and ensuring satisfied electrical connection in the transreceiver. The ultrasonic transreceiver includes a spring for downwardly forcing the piezoelectric transducer arranged in the housing against a bottom surface of the housing. The transreceiver may include a viscous or elastic member arranged between the housing and the piezoelectric transducer to prevent a gas boundary layer from being formed therebetween. Also, the transreceiver may include a coiled spring laterally arranged between the housing and the piezoelectric transducer to forcedly press them apart from each other and electrically connect them to each other.

15 Claims, 4 Drawing Sheets

ULTRASONIC TRANSRECEIVER

BACKGROUND OF THE INVENTION

1. Field of the Invention

This invention relates to an ultrasonic transmitter-receiver (hereinafter referred to as "transreceiver"), and more particularly to an ultrasonic transreceiver for measuring the flow velocity and flow rate of gas flowing through a pipe using ultrasonic wave.

2. Description of the Prior Art

An apparatus has been developed and extensively used in a variety of fields which is adapted to measure the flow velocity and flow rate of gas such as air, steam, exhaust gas or the like flowing through a pipe utilizing a variation of propagation velocity of ultrasonic wave propagated through the gas.

Such a conventional apparatus for measuring the flow velocity and flow rate of gas utilizing ultrasonic wave is typically constructed in such a manner as shown in FIG. 1. More particularly, an apparatus shown in FIG. 1 includes a pair of ultrasonic transreceivers 10A and 10B arranged on a wall of a pipe 12 in a manner to be obliquely opposite to each other. The ultrasonic transreceivers 10 are alternately excited and controlled by a controller 14. Thus, in the apparatus, the flow velocity and flow rate of gas flowing through the pipe 12 are measured on the basis of the difference between a period of time for which ultrasonic wave is propagated from the transreceiver 10A to the transreceiver 10B and that for which it is propagated from the transreceiver 10B to the transreceiver 10A.

In general, the conventional ultrasonic transreceivers 10A and 10B used in the flow velocity and flow rate measuring apparatus each are typically constructed as shown in FIG. 2. The conventional ultrasonic transreceiver 10 includes a housing 16 formed of a metal material to have an upper open end and a lower closed end. The ultrasonic transreceiver 10 also includes a piezoelectric transducer 18 formed of a ceramic material and having piezoelectric characteristics, which is fixed on a bottom wall of the housing 16 by means of an adhesive. The piezoelectric transducer 18 is formed on an upper surface thereof with a first electrode or positive electrode 20. The positive electrode 20 is made of a suitable material such as gold, silver, nickel or the like into a film-like shape by vapor deposition, baking, plating or the like. Also, the piezoelectric transducer 18 is formed on a lower end thereof and a peripheral surface in proximity to the lower end with a second electrode or negative electrode 22 and a connection 24 in a manner to be contiguous to each other. The negative electrode 22 is formed in substantially same manner as the positive electrode 20.

The ultrasonic transreceiver 10 also includes an insulating member 26 which is formed with a vertical through-hole and securely fitted in the upper open end of the housing 16, and a pipe-like plug 28 of which a lower portion is fixedly fitted in the central through-hole of the insulating member 26. The plug 28 and positive electrode 20 are electrically connected to each other by means of a first lead wire 30. The connection of the lead wire 30 with respect to the plug 28 and positive electrode 20 is carried out by soldering. Likewise, the negative electrode 22 and housing 16 are electrically connected to each other through a second lead wire 32 by soldering.

The ultrasonic transreceivers 10A and 10B constructed as described above, as shown in FIG. 1, are integrally mounted in terminal boxes 34A and 34B which are then fixed in sockets 36A and 36B of the pipe 12 by means of screws or flanges, respectively.

Unfortunately, the measuring of flow velocity and flow rate of hot gas such as steam or the like flowing through the pipe 12 by means of the ultrasonic transreceivers 10A and 10B described above causes the transreceivers to be contacted directly with the hot gas, so that the transreceivers may undergo a sudden temperature variation and a severe heat cycle.

Such temperature variation and heat cycle lead to the generation of deviation thermal strain due to the difference in a thermal expansion coefficient between the housing 16 and the piezoelectric transducer 18, resulting in internal stress being produced at the adhesive-bonded portion between the housing 16 and the piezoelectric transducer 18. When the so-produced internal stress or thermal stress is above the bond strength of an adhesive used in the transreceiver 10, any breakage occurs at the adhesive-bonded portion to cause the piezoelectric transducer to be gradually peeled off from the housing 16.

Such peeling causes a gas boundary layer to be formed between the piezoelectric transducer 18 and the housing 16, so that an ultrasonic pulse signal received by the piezoelectric transducer 18 may be subjected to the attenuation of propagation due to diffusion, absorption, dispersion and the like to be highly decreased in level. It would be considered to use an adhesive of high bond strength in order to prevent such peeling. However, this causes the internal stress due to the deviation thermal strain to be generated in the interior of the piezoelectric transducer 18, so that it may be broken to a degree sufficient to fail in the transmitting and receiving of ultrasonic wave. Accordingly, the transreceiver fails to measure the flow velocity and flow rate of gas flowing through the pipe 12.

Further, the direct contacting of the transreceiver with hot gas causes it to be heated to a temperature approximate to that of the hot gas. This leads to the melting of solder used for connecting the lead wires 30 and 32 to the electrodes 20 and 22 of the piezoelectric transducer 18, resulting in a failure in electrical connection therebetween.

In order to minimize such a problem, it would be proposed to use high temperature solder. However, this promotes a solid metal-molten metal diffusion phenomenon which causes metal forming the electrodes 20 and 22 to be diffused into molten solder metal during soldering, because the soldering is carried out at a high temperature. This results in the peel strength of the electrodes 20 and 22 being highly decreased to lead peeling of the lead wires 30 and 32 from electrodes.

Also, the exposing of the piezoelectric transducer 18 to a high temperature for a long period of time highly promotes a solid metal-solid metal diffusion phenomenon which causes metal of the electrodes 20 and 22 to be diffused into solder metal, so that the electrodes may be peeled from the piezoelectric transducer 18 together with the lead wires 30 and 32.

Such a failure in electrical connection between the electrodes and the piezoelectric transducer due to the peeling of the electrodes therefrom renders the measuring of the flow velocity and flow rate of gas flowing through the pipe substantially impossible. This requires the ultrasonic transreceiver to be frequently replaced.

Accordingly, it would be high desirable to develop an ultrasonic transreceiver which is capable of effectively preventing the formation of a gas boundary layer between a piezoelectric transducer and a housing due to thermal stress and the breakage of the piezoelectric transducer and preventing the peeling of electrodes from a piezoelectric transducer even when it is exposed to a high temperature.

SUMMARY OF THE INVENTION

The present invention is generally directed to an ultrasonic transreceiver. An ultrasonic transreceiver of the present invention includes a housing and a plug mounted with respect to the housing in a manner to be electrically insulated from the housing. The ultrasonic transreceiver also includes a piezoelectric transducer arranged in the housing and provided with a positive electrode and a negative electrode. The piezoelectric transducer is forcedly pressed against the housing by bias means so as to be in close contact with the housing, so that not only the formation of a gas boundary layer between the housing and the piezoelectric tranducer and the breakage of the piezoelectric transducer may be effectively prevented but satisfied electrical connection in the ultrasonic transreceiver may be ensured. The bias means may be arranged to downwardly force the piezoelectric transducer against a bottom surface of the housing. For this purpose, the bias means may comprise a holding member fitted on an upper portion of the piezoelectric transducer and a compressed coiled spring fitted on the holding member and interposed between the plug and the holding member. Alternatively, it may comprise a compressed coiled spring directly arranged between the plug and an upper end surface of the piezoelectric transducer.

Further, the ultrasonic transreceiver of the present invention may include a gas intrusion blocking means arranged between the piezoelectric transducer and the housing which are forcedly pressed against each other by means of the bias means. The gas intrusion blocking means may comprise a viscous member. Alternatively, it may comprise an elastic member. Such construction allows the formation of a gas boundary layer to be more effectively prevented.

In addition, the ultrasonic transducer of the present invention may include pressing means formed of an electrically conductive material, which serves to laterally press the piezoelectric transducer and housing apart from each other and electrically connect piezoelectric transducer and housing to each other therethrough. The pressing means may comprise a spring. Such construction permits more satisfied electrical connection to be formed in the ultrasonic transreceiver and such a second lead wire as described above to be eliminated.

Furthermore, the ultrasonic transreceiver of the present invention may include an electrically conductive plate member arranged on the positive electrode in a manner to be in close contact with the first electrode. Such construction prevents the wearing of the positive electrode due to the vibrational contact of the plug with the electrode.

Accordingly, it is an object of the present invention is to provide an ultrasonic transreceiver which is capable of measuring the flow velocity and flow rate of hot gas with high reliability.

It is another object of the present invention to provide an ultrasonic transreceiver which is capable of effectively preventing the formation of a gas boundary layer between a housing and a piezoelectric transducer and the breakage of the piezoelectric transducer due to thermal stress and ensuring the formation of satisfied electrical connection in the ultrasonic transreceiver.

It is a further object of the present invention to provide an ultrasonic transreceiver which is capable of more effectively preventing the formation of a gas boundary layer between a piezoelectric transducer and a housing and the breakage of the piezoelectric transducer due to thermal stress.

It is a still further object of the present invention to provide an ultrasonic transreceiver which is capable of more effectively preventing the peeling of electrodes from a piezoelectric transducer leading to a failure in electrical connection therebetween.

It still another object of the present invention to provide an ultrasonic transreceiver which is capable of accomplishing the above-described objects with a simple structure.

Still other objects and advantages of the invention will in part be obvious and will in part be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is had to the following description taken in connection with the accompanying drawings in which like reference numerals designate like or corresponding parts throughout; wherein.

DETAILED DESCRIPTION OF THE PREFERRED EMBODIMENTS

Figure 3:
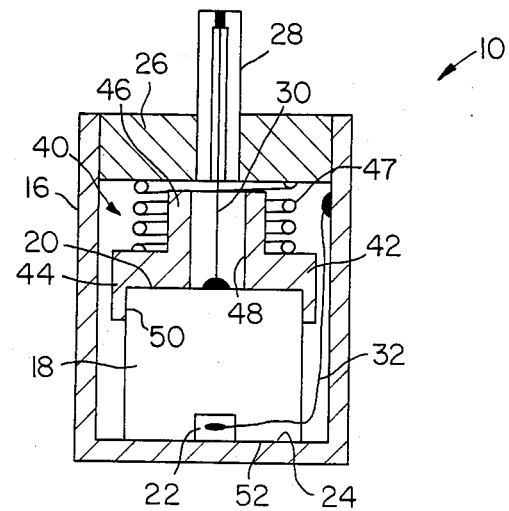
FIG. 3 is a vertical sectional view showing an embodiment of an ultrasonic transreceiver according to the present invention.

Reference is first made to FIG. 3 wherein an embodiment of an ultrasonic transreceiver according to the present invention, generally indicated at reference numeral 10, is depicted. The ultrasonic transreceiver 10 includes a housing 16 formed of a metal material to have an upper open end and a lower closed end. The ultrasonic transreceiver 10 also includes a piezoelectric transducer 18 formed of a ceramic material to have piezoelectric characteristics. The piezoelectric transducer 18 is formed on an upper end surface thereof with a first electrode or positive electrode 20, as in the conventional ultrasonic transreceiver described above. Also, the piezoelectric transducer 18 is formed on a lower end thereof with a second electrode or negative electrode 22.

The transreceiver 10 also includes an insulating member 26 which is formed with a vertical through-hole and securely fitted in the upper open end of the housing 16, and a pipe-like plug 28 of which a lower portion is fixedly fitted in the through-hole of the insulating member 26. The plug 28 and positive electrode 20 are electrically connected to each other by means of a first lead wire 30. The connection of the lead wire 30 with respect to the plug 28 and positive electrode 20 may be carried out by soldering. Also, the negative electrode 22 and housing 16 are electrically connected to each other through a second lead wire 32 by soldering.

One of features of the present invention is that bias means generally designated by reference numeral 40 is provided between the plug 28 and the positive electrode 20 of the piezoelectric transducer 18 to forcedly press the the piezoelectric transducer 18 against a bottom wall of the housing 16. In the illustrated embodiment, the bias means 40 includes a holding member 42 which is formed into a substantially convex shape to have a lower enlarged portion 44 and an upper reduced portion 46 of a smaller diameter upwardly projected from the lower enlarged portion 44. The holding member 42 is formed with a central through-hole 48 via which the first lead wire 30 extends between the plug 28 and the positive electrode 20. The lower enlarged portion 44 is formed with a counterbore-like recess 50 communicated with the through-hole 48, in which an upper portion of the piezoelectric transducer 18 is adapted to be fittedly held. The holding member 42 may be made of an insulating material.

The bias means 40 also includes a compressed coiled spring 47 fitted on the upper reduced portion 48 of the holding member 42 in a manner to be interposed between the lower enlarged portion 46 of the member 42 and the insulating member 26 to downwardly urge the holding member 42, so that the piezoelectric may be constantly forced pressed against the bottom wall of the housing 16.

Thus, it will be noted that such featured construction of the illustrated embodiment effectively prevents any gap from being formed between the piezoelectric transducer 18 and the bottom wall of the housing 16 sufficient to form a gas boundary layer therebetween and the transducer 18 from being damaged due to deviation thermal strain, as well as the electrodes 20 and 22 from peeling from the piezoelectric transducer 18.

The illustrated embodiment may be constructed to interpose gas intrusion blocking means 52 between the negative electrode 22 and the bottom wall of the housing 16, to thereby more effectively prevent the formation of a gas boundary layer therebetween. The gas intrusion blocking means 52 may comprise a viscous member utilizing a suitable viscous material such as grease or the like.

Thus, in the embodiment shown in FIG. 3, any adhesive is not used for fixing the piezoelectric transducer 18 with respect to the housing 16; accordingly, even when the housing 16 is subjected to a sudden thermal variation, the generation of large thermal stress in the piezoelectric transducer 18 can be substantially prevented. This significantly improves the heat resistance, thermal cycle resistance and heat shock resistance of the ultrasonic transreceiver and effectively prevents the piezoelectric transducer from failing in the transreceiving of a signal due to its breakage. Also, the arrangement of the viscous member 52 between the piezoelectric transducer 18 and the bottom wall of the housing 16 more effectively prevents the formation of any gas boundary layer therebetween, so that the attenuation of propagation may be substantially prevented to ensure the transreceiving with high efficiency.

Figure 1:
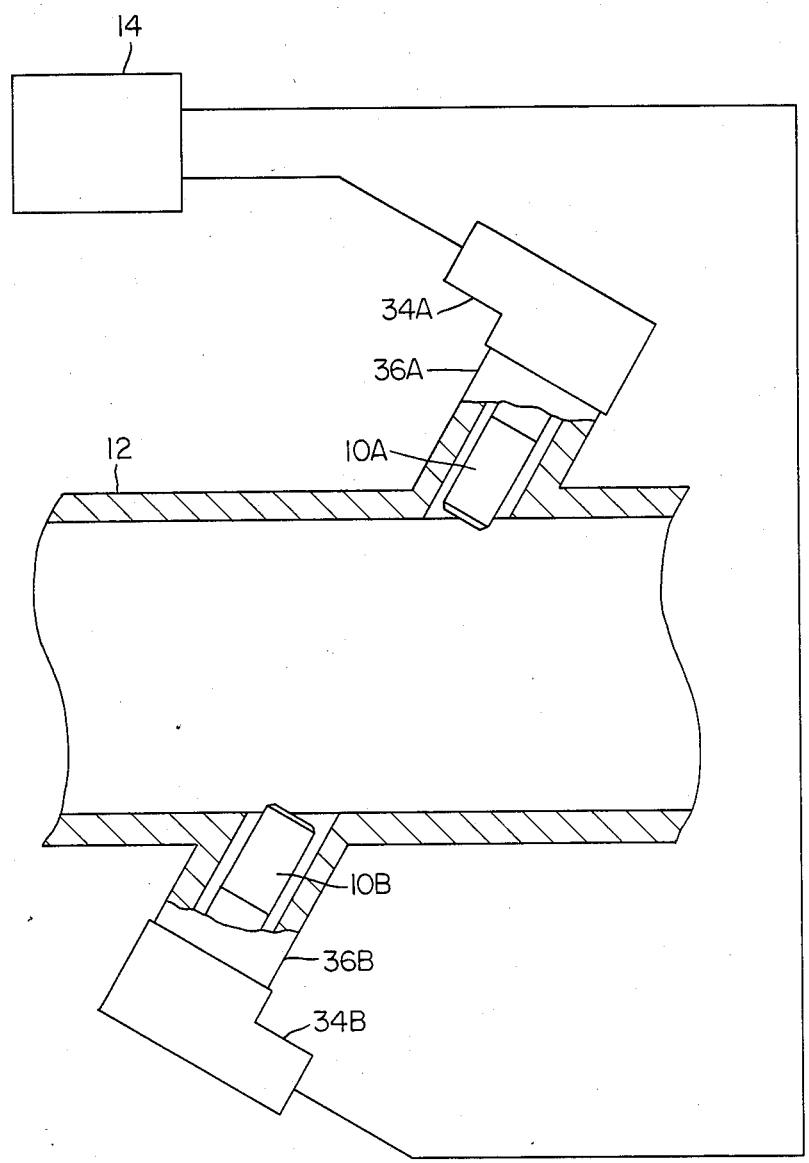
FIG. 1 is a schematic view showing a general structure of an apparatus for measuring the flow velocity and flow rate of gas flowing through a pipe.
Figure 2:
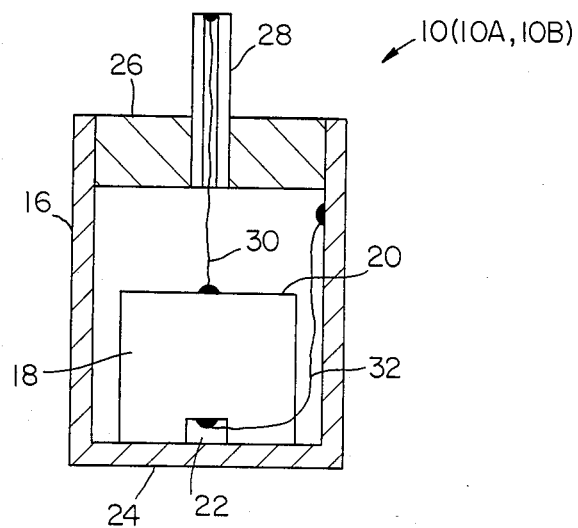
FIG. 2 is a vertical sectional view showing a conventional ultrasonic transreceiver.

The remaining part of the embodiment shown in FIG. 3 may be constructed in substantially the same manner as the conventional ultrasonic transreceiver shown in FIG. 2.

Figure 4:
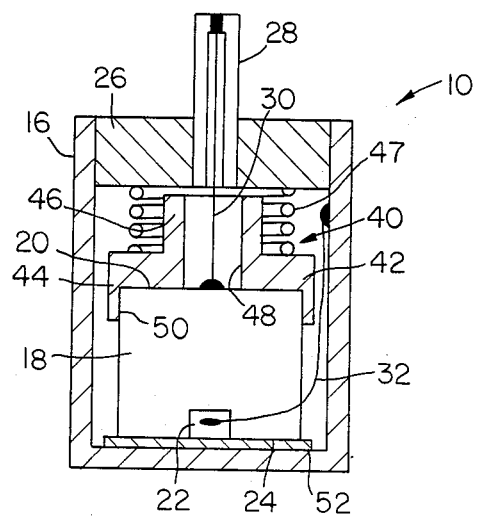
FIG. 4 is a vertical sectional view showing a modification of the embodiment of FIG. 3.

FIG. 4 shows a modification of the embodiment shown in FIG. 3, wherein an elastic member formed of silicone rubber or the like is used as a gas intrusion blocking means 52. The remaining part of an ultrasonic transreceiver of the modification is constructed in substantially the same manner as the embodiment of FIG. 3.

In the modification shown in FIG. 4, a piezoelectric transducer 18 is forcedly and fixedly pressed against a bottom wall of a housing 16 through the elastic member 52 by means of a bias means 40. At this time, the elastic member 52 is elastically compressedly deformed due to the force of the bias means 40 applied through the piezoelectric transducer 18 thereto to accomplish the airtight contact between the elastic member 52 and a negative electrode 22 and that between the elastic member 52 and the bottom wall of the housing 16, to thereby prevent the intrusion of gas between the bottom wall of the housing 16 and the piezoelectric transducer 18. Thus, it will be noted that the modification shown in FIG. 4 likewise effectively prevents the formation of any gas boundary layer therebetween, so that the attenuation of propagation may be substantially prevented to ensure the transreceiving of an ultrasonic transreceiver 10 with high efficiency.

In the embodiment described above, a viscous member or elastic member is used as the gas intrusion blocking means 52. However, the gas intrusion blocking member 52 may be formed of an electrically conductive material. This allows electrical connection between the negative electrode 22 and the housing 16 to be formed by the gas intrusion blocking member 52 without using the second lead wire 32.

Figure 5:
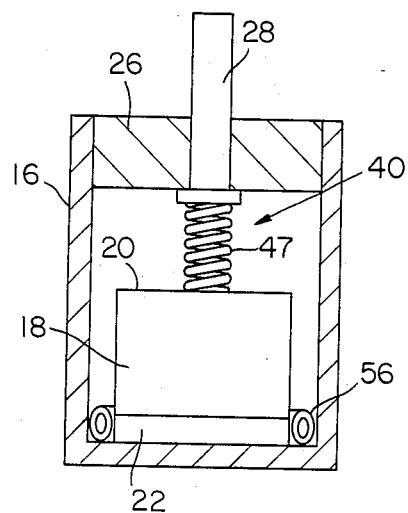
FIG. 5 is a vertical sectional view showing another embodiment of an ultrasonic transreceiver according to the present invention.

FIG. 5 shows another embodiment of an ultrasonic transreceiver according to the present invention. The embodiment shown in FIG. 5 is adapted to more effectively prevent the peeling of electrodes from a piezoelectric transducer.

In an ultrasonic transreceiver of the second embodiment, a bias means 40 comprises a compressed coiled spring 47 directly arranged between a lower end of a plug 28 and a piezoelectric transducer 18, so that a holding member such as the holding member 42 in the embodiment described above may be eliminated. The compressed coiled spring 47 is formed of an electrically conductive material. Another featured construction of the second embodiment illustrated is that pressing means of an electrically conductive material 56 is arranged in a manner to be laterally interposed between a negative electrode 22 and a housing 16 to laterally press both members 22 and 16 apart from each other. The pressing means 56 may comprise a compressed coiled spring. Alternatively, it may comprise a spring of a substantially u-shape in section. The remaining part of the embodiment shown in FIG. 5 is constructed in substantially the same manner as that of FIG. 3.

In the second embodiment of the above-described featured construction, the bias means 40 is formed of an electrically conductive material, accordingly, it electrically connects the positive electrode 20 and the plug 28 to each other therethrough while keeping them at a face contact state therethrough and downwardly urges the piezoelectric transducer 18 against the bottom wall of the housing 16. Likewise, the pressing means 56 electrically connects the negative electrode 22 and the housing 16 to each other therethrough while keeping them at a face contact state therethrough. Thus, it will be noted that the embodiment effectively and stably ensures satisfied electrical connection irrespective of a variation of an environment such as a temperature and the like. Also, the electrically conductive property of the bias means 40 and pressing means 56 allows lead wires for forming electrical connection in the ultrasonic transreceiver 10 to be eliminated to simplify the structure of the transreceiver.

Figure 6:
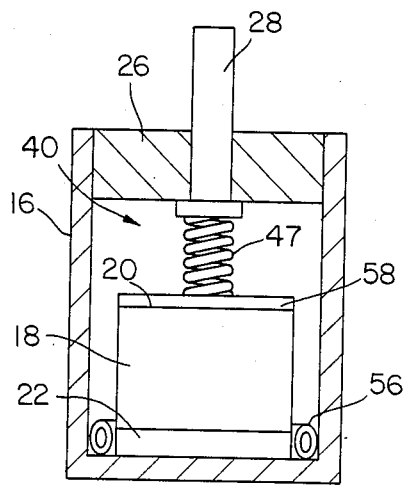
FIG. 6 is a vertical sectional view showing a modification of the embodiment shown in FIG. 5.

FIG. 6 shows a modification of the embodiment shown in FIG. 5. The modification is so constructed that a conductive plate member 58 is interposedly arranged between a bias means 40 and positive electrode 20. The conductive plate member 58 is formed of a metal material and arranged in close contact with the positive electrode 20. Such construction effectively prevents an oxide film from being formed on the positive electrode 20, to thereby ensure satisfied electrical connection between a plug 28 and a piezoelectric transducer 18. Also, this prevents the wearing of the positive electrode 20 due to the vibrational contact between the electrode 20 and the bias means 40. The remaining part of the modification is constructed in substantially the same manner as the embodiment of FIG. 5.

Thus, it will be noted that the embodiment shown in FIGS. 5 and 6 positively eliminates the above-described disadvantages encountered with the prior art utilizing soldering and effectively and stably keeps satisfied electrical connection of the electrodes with respect to the plug and housing. Also, the second embodiment accomplishes such advantages with a simple structure.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. An ultrasonic transreceiver comprising:
   a housing;
   a piezoelectric transducer arranged in said housing and provided with a positive electrode and a negative electrode;
   a plug mounted with respect to said housing; and
   bias means for forcedly pressing said piezoelectric transducer against said housing;
   wherein said biasing means downwardly forcedly press said piezoelectric transducer against a bottom wall of said housing,
   wherein said biasing means comprise a holding member fitted on an upper portion of said piezoelectric transducer and a compressed coiled spring fitted on said holding member and interposed between said plug and said holding member,
   wherein said holding member comprises a lower enlarged portion and an upper reduced portion of smaller diameter upwardly projecting from said enlarged portion,
   said lower enlarged portion comprising a counterbore like recess in which an upper portion of said piezoelectric transducer is adapted to be fittedly retained,
   wherein said spring is situated about said upper reduced portion,
   and additionally comprising
   an insulating member through which said plug is mounted with respect to said housing, and
   said holder extends close to said insulating member and is spaced a short distance therefrom,
   whereby said transducer is constrained against lateral wobbling.

2. An ultrasonic transreceiver as defined in claim 1 further comprising gas intrusion blocking means arranged between said piezoelectric transducer and said housing forcedly pressed against each other.

3. An ultrasonic transreceiver as defined in claim 2, wherein said gas intrusion blocking means comprise a viscous member.

4. An ultrasonic transreceiver as defined in claim 2, wherein said gas intrusion blocking means comprise an elastic member.

5. The transreceiver of claim 1, wherein said holding member comprises a lower enlarged portion and an upper reduced portion of smaller diameter upwardly projecting from said enlarged portion,
   said lower enlarged portion comprising a counterbore like recess in which an upper portion of said piezoelectric transducer is adapted to be fittedly retained.

6. The transreceiver of claim 1, wherein said holding member is formed of electrically insulated material.

7. The transreceiver of claim 5, wherein said spring is situated about said upper reduced portion.

8. The transreceiver of claim 1, additionally comprising
   an insulating member through which said plug is mounted with respect to said housing, and
   said holder extends close to said insulating member and is spaced a short distance therefrom,
   whereby said transducer is constrained against lateral wobbling.

9. An ultrasonic transreceiver as defined in claim 1 further comprising pressing means laterally interposed between said housing and said piezoelectric transducer in a manner to forcedly laterally press said piezoelectric transducer and housing apart from each other and formed of an electrically conductive material to electrically connect said piezoelectric transducer and said housing to each other therethrough.

10. An ultrasonic transreceiver as defined in claim 9, wherein said pressing means comprise a compressed coiled spring.

11. An ultrasonic transreceiver as defined in claim 9, wherein said pressing means comprose a coiled spring of a U-shape in section.

12. An ultrasonic transreceiver comprising:
    a housing having an upper open end and a lower closed end;
    a piezoelectric transducer arranged in said housing;
    a plug mounted with respect to said housing through an insulating member;

a positive electrode provided at an upper end surface of said piezoelectric transducer and electrically connected to said plug;

a negative electrode provided at a lower portion of said piezoelectric transducer and electrically connected to said housing;

bias means arranged between said plug and said piezoelectric transducer to forcedly press said piezoelectric transducer against a bottom wall of said housing; and gas intrusion blocking means between a lower end surface of said piezoelectric transducer and a bottom wall of said housing;

wherein said bias means comprise a holding member fitted on an upper portion of said piezoelectric transducer and a compressed coiled spring fitted on said holding member and interposed between said plug and said holder member, wherein said holding member comprises a lower enlarged portion and an upper reduced portion of smaller diameter upwardly projecting from said enlarged portion, said lower enlarged portion comprising a counterbore like recess in which an upper portion of said piezoelectric transducer is adapted to be fittedly retained, wherein said spring is situated about said upper reduced portion, and additionally comprising an insulating member through which said plug is mounted with respect to said housing, and said holder extends close to said insulating member and is spaced a short distance therefrom, whereby said transducer is constrained against lateral wobbling.

13. An ultrasonic transreceiver according to claim 12, further comprising pressing means laterally arranged between said housing and said piezoelectric transducer to forcedly laterally press said housing and piezoelectric transducer away from each other, said pressing means being formed of an electrically conductive material so that the electrical connection between said housing and said negative electrode of said piezoelectric transducer may be accomplished therethrough.

14. An ultrasonic transreceiver according to claim 12, further comprising pressing means laterally arranged between said housing and said piezoelectric transducer to forcedly laterally press said housing and piezoelectric transducer away from each other, said pressing means being formed of an electrically conductive material so that the electrical connection between said housing and said negative electrode of said piezoelectric transducer may be accomplished therethrough; and an electrically conductive plate member arranged on said first electrode in a manner to be in close contact with said first electrode.

15. The transreceiver of claim 12, wherein said holding member comprises a substantially central through-hole, through which a lead wire extends between said plug and positive electrode.

* * * * *